(12) United States Patent
Rinkleff et al.

(10) Patent No.: US 10,384,551 B2
(45) Date of Patent: Aug. 20, 2019

(54) ELECTROMAGNETIC DECOUPLING OF AN ANTENNA UNIT OF A MOTOR VEHICLE FROM AN ENERGY COUPLING DEVICE

(71) Applicant: AUDI AG, Ingolstadt (DE)

(72) Inventors: Thomas Rinkleff, Ingolstadt (DE); Kai Friedrich, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 261 days.

(21) Appl. No.: 15/665,624

(22) Filed: Aug. 1, 2017

(65) Prior Publication Data
US 2018/0050595 A1  Feb. 22, 2018

(30) Foreign Application Priority Data
Aug. 18, 2016 (DE) .......... 10 2016 215 503

(51) Int. Cl.
| | | |
|---|---|---|
| *H01F 38/00* | (2006.01) | |
| *B60L 11/18* | (2006.01) | |
| *H02J 50/80* | (2016.01) | |
| *H02J 50/10* | (2016.01) | |
| *H01F 27/36* | (2006.01) | |
| *H01F 38/14* | (2006.01) | |

(Continued)

(52) U.S. Cl.
CPC .......... *B60L 11/182* (2013.01); *B60L 53/12* (2019.02); *B60L 53/22* (2019.02); *H01F 27/362* (2013.01); *H01F 38/14* (2013.01); *H01Q 1/248* (2013.01); *H01Q 1/32* (2013.01); *H01Q 1/3291* (2013.01); *H01Q 1/526* (2013.01); *H01Q 7/00* (2013.01); *H02J 50/10* (2016.02); *H02J 50/80* (2016.02); *H01F 2027/348* (2013.01); *Y02T 10/7005* (2013.01); *Y02T 10/7072* (2013.01); *Y02T 90/122* (2013.01); *Y02T 90/127* (2013.01); *Y02T 90/14* (2013.01)

(58) Field of Classification Search
CPC ....................................................... B60L 53/12
USPC ................................................. 307/104, 10.1
See application file for complete search history.

(56) References Cited

U.S. PATENT DOCUMENTS

| | | |
|---|---|---|
| 7,358,923 B2 | 4/2008 | Terry |
| 2015/0137615 A1 | 5/2015 | De Boodt |

FOREIGN PATENT DOCUMENTS

| | | |
|---|---|---|
| DE | 102011084071 A1 | 4/2013 |
| DE | 102013225241 A1 | 6/2015 |

(Continued)

OTHER PUBLICATIONS

Examination Report dated Mar. 13, 2017 of corresponding German application No. 102016215503.2; 5 pgs.

*Primary Examiner* — Rexford N Barnie
*Assistant Examiner* — Dru Parries
(74) *Attorney, Agent, or Firm* — Maier & Maier, PLLC (57) ABSTRACT

A motor vehicle having a vehicle body, which is formed at least in part from an electrically conductive material. An electrical system is arranged electrically insulated from the vehicle body and has a rectifier unit. An energy coupling device is arranged electrically insulated at the vehicle body for supplying electric energy for the electrical system. The energy coupling device has a coil for wireless magnetic coupling of an energy source that is external to the motor vehicle and provides an alternating magnetic field, wherein the coil is connected to the rectifier unit of the electrical system. An antenna unit is arranged at the vehicle body and (Continued)

is electrically insulated with respect to the electrical system. A decoupling device electromagnetically decouples the coil from the antenna unit.

10 Claims, 6 Drawing Sheets

(51) Int. Cl.
*H01Q 1/32* (2006.01)
*H01Q 1/52* (2006.01)
*H01Q 1/24* (2006.01)
*H01Q 7/00* (2006.01)
*B60L 53/22* (2019.01)
*B60L 53/12* (2019.01)
*H01F 27/34* (2006.01)

(56) References Cited

FOREIGN PATENT DOCUMENTS

| | | |
|---|---:|---|
| EP | 2808196 A1 | 12/2014 |
| WO | 2010/060062 A1 | 5/2010 |
| WO | 2014186231 A1 | 11/2014 |
| WO | 2016/030114 A1 | 3/2016 |

ELECTROMAGNETIC DECOUPLING OF AN ANTENNA UNIT OF A MOTOR VEHICLE FROM AN ENERGY COUPLING DEVICE

FIELD

The present invention relates to a motor vehicle with a vehicle body that is formed at least in part from an electrically conductive material, an electrical system that is arranged electrically insulated from the vehicle body and has a rectifier unit, and an energy coupling device that is arranged electrically insulated at the vehicle body for supplying electric energy for the electrical system, wherein the energy coupling device has a coil for wireless magnetic coupling of an energy source that is external to the motor vehicle and provides an alternating magnetic field, wherein the coil is connected to the rectifier unit of the electrical system, and an antenna unit, which has an antenna element, is arranged at the vehicle body, and is electrically insulated with respect to the electrical system for providing a wireless-based communication link between a terminal communication device at the motor vehicle end and a remote communication station external to the motor vehicle.

BACKGROUND

Motor vehicles of the generic type with an energy coupling device for wireless magnetic coupling of an energy source external to the motor vehicle for wireless transmission of energy by means of an alternating magnetic field are known in basic principle, so that a separate documentation of publications to this end is not needed. The motor vehicle has the energy coupling device in order that energy can be supplied to the motor vehicle and preferably stored in the electric energy storage unit of the motor vehicle for the purpose of implementing its intended operation, such as, for example, its drive mode. The energy is supplied by means of the energy source external to the motor vehicle, such as, for example, a charging station or the like, which, on its part, is connected to an electric energy source, for example to a public energy supply grid, an electric generator, a battery, and/or the like. The charging station produces the alternating magnetic field with uptake of electric energy from the electric energy source. The energy coupling unit of the motor vehicle detects the alternating magnetic field by means of the coil, takes energy from it, and supplies electric energy at the motor vehicle end, in particular to supply the electric energy storage unit of the motor vehicle and/or also an electric engine of the drive device with electric energy.

The motor vehicle generally has an electrical system, which, in particular in the case of an electrically drivable motor vehicle, comprises an electrical drive unit for the motor vehicle. Beyond this, the electrical system generally also comprises the electric energy storage unit, which is usually designed as a rechargeable battery. In electrically drivable motor vehicles, the electric energy storage unit is often constituted by a high-voltage battery. The high-voltage battery can comprise, for example, a lithium ion rechargeable battery or the like. The electric energy storage unit supplies the electric energy for, among other things, the intended operation of the electrical system.

Motor vehicles of the generic type comprise the energy coupling device for supplying electric energy for the electrical system. Energy coupling devices that have a coil for wireless magnetic coupling of an energy source that is external to the motor vehicle and provides a magnetically alternating field are finding increasing use. In this way, an electromechanical coupling of the motor vehicle to the energy source external to the motor vehicle for supplying electric energy—for example, a connection of the motor vehicle to a charging station by means of a charging cable or the like—is no longer required. Nevertheless, said electromechanical coupling can also still be provided as an option. Advantages thereby ensue for the user of the motor vehicle in regard to service thereof, because, namely, a mechanical linkage—for example, by means of a charging cable or the like—is not needed for the purpose of energy coupling. In order that the energy coupling device can transform the energy supplied by means of the alternating magnetic field to electric energy and supply it to the electrical system, the coil is connected to a rectifier unit of the electrical system.

Because the vehicle body is generally constructed at least in part from an electrically conductive material, such as, for example, metal plate and, in particular, sheet metal, it is generally provided that the electrical system as well as the energy coupling device are arranged electrically insulated with respect to the vehicle body.

In systems in which energy is transmitted by means of an alternating magnetic field, also referred to as inductive energy transmission systems, the inductances of participating coil circuits are altered by variation of the distance of separation and/or by variation of a displacement.

During operation of a system for wireless energy coupling and, in particular, for inductive energy coupling, a large number of interferences, in particular electromagnetic interactions, can cause radio frequency interferences and/or the like, for example. At the energy source end, it is possible by means of classical measures of interference suppression, such as, for example, interference suppression filters and/or the like, to well attenuate these interferences, so that a required electromagnetic compatibility (EMC) can generally be achieved in this regard by appropriate damping or the like, so that the intended operation of all electrical devices can essentially be ensured in a reliable manner.

However, on account of the conversion principle, emitted interference occurs at the motor vehicle end, which, on the one hand, can be suppressed only poorly; and on the other hand, classical filtering measures are often accessible only to an inadequate extent. For example, a source of interference results in that, in correspondence to the alternating magnetic field, the coil of the energy coupling device provides an electric alternating current voltage at its terminals, which, for the purpose of supplying energy to the electrical system of the motor vehicle, is rectified by means of the rectifier unit. The rectifier unit usually comprises a bridge rectifier. Voltage jumps can occur that can lead to undesired emitted interference. However, such problems can also occur during operation at a half-wave rectifier, a full-wave rectifier, or like circuits.

In this case, among other things, a problem has proven to be that, on account of the rectifying function, the electric voltage at the terminals of the coil can be subject to high rates of change ensuing from the intended operation. As a result of this, both conductor-associated and non-conductor-associated emitted interference can be released, said emitted interference extending into frequency regions in which wireless-based communication takes place, such as, for example, medium-wave regions, short-wave regions, ultra-short-wave regions, television (TV) regions, digital audio broadcasting (DAB) regions, and/or the like.

The motor vehicle generally has the antenna unit, which serves for providing a wireless-based communication link. Through the arrangement of the antenna unit on the vehicle body, which is generally arranged as electrically insulated as well, electromagnetic and, in particular, capacitive coupling can result in an in-coupling of interferences produced by the coil during intended operation, so that interference voltages can be in-coupled into the antenna unit and interfere with, if not even totally prevent, the intended operation of the antenna unit for providing the wireless-based communication link.

WO 2010/060062 A1 further discloses a reduced interference between receivers and wireless power transmitters. Furthermore, DE 10 2013 225 241 A1 discloses a field shielding during inductive charging. In addition, WO 2016/030114 A1 discloses an inductive energy transmission system. Finally, EP 2 808 196 A1 discloses a transmitter element.

SUMMARY

The object of the invention is therefore based on improving operation of the wireless-based communication link during operation of the energy coupling device.

At the motor vehicle end, it is proposed, in particular, that the motor vehicle has a decoupling device for the electromagnetic decoupling of the coil from the antenna unit.

In terms of the invention, motor vehicles comprise, in particular, electrically drivable motor vehicles, such as, for example, an electric motor vehicle, a hybrid motor vehicle, such as a plug-in hybrid motor vehicle, a mild hybrid motor vehicle, or the like, which can be driven both electrically and by means of an internal combustion engine or the like. Even though the invention is directed preferably at electrically drivable motor vehicles, it can be employed in basic principle also for other motor vehicles to which energy can be supplied wirelessly by means of an alternating magnetic field.

However, the application of the invention is not limited to motor vehicles. It can likewise be employed for devices to which energy is to be supplied wirelessly, such as, for example, portable electronic devices, such as mobile wireless terminal devices, dictation devices, measurement devices, and/or the like.

The invention is based on the knowledge that a shielding of the coil is not possible or is possible only within limitations, because, of course, the coil has to be exposed to the alternating magnetic field in order that energy can be transmitted wirelessly as intended. Although a limitation of the rate of voltage increase at the terminals of the coil by means of a filter—for example, in a connecting conductor between the coil and the rectifier unit or between the rectifier unit and a direct current intermediate circuit of the electrical system—would be conceivable, such a filter would have a detrimental effect on the energy transmission by giving rise to resonances, for example, and could not be implemented or could be implemented only with quite considerable effort.

The invention utilizes the effect that the antenna element of the antenna unit detects an electric potential difference between the antenna unit and the vehicle body. The electrical system and the energy coupling unit are arranged electrically insulated from the vehicle body and the antenna unit. A connection between the energy coupling unit and the antenna unit or the vehicle body therefore exists essentially solely capacitively, that is, through parasitic capacitances.

The invention takes into account that the electrical system, in particular unshielded areas of the electrical system, can be designed symmetrically, so that the electrical system can be supplied in such a way that a pure push-pull signal can be applied to the electric potentials thereof, so that any emitted interference can be zero in the ideal case.

This purpose is served by the decoupling device for electrical decoupling of the coil from the antenna unit. Namely, it is possible with the decoupling device to reduce the undesired coupling through the parasitic capacitances, if not to suppress them even completely. As a result of the reduction or suppression of undesired coupling, interferences in-coupled into the antenna unit and, in particular, into the antenna element can be reduced or suppressed, so that, even during operation of the energy coupling device, it is possible to ensure a reliable operation of the antenna unit, so that the provision of the wireless-based communication link can be realized largely without any interference.

The decoupling device thus serves to influence a coupling through the parasitic capacitances in a suitable manner in order that the electromagnetic coupling and, in particular, the capacitive coupling of the coil to the antenna unit can be reduced, if not in fact completely suppressed.

For this purpose, there exists the possibility of making a capacitive coupling of the coil to the vehicle body as large as possible in comparison to a capacitive coupling of the antenna unit to the vehicle body or vice versa. Generally, however, the first case ought to be more appropriate to implement, because, even in the version without a decoupling device, the capacitive coupling of the antenna unit to the coil usually ought to be already markedly smaller than the capacitive coupling of the coil to the vehicle body. In the process, this embodiment utilizes the fact that the antenna unit usually has an impedance converter. In this way, at least a part of a voltage drop at the impedance converter, which is dependent on the emitted interference, can be reduced, so that any interference of the communication link can likewise thereby be reduced.

Alternatively or additionally, it can be provided, moreover, that undesired parasitic common mode signals in the area of the electrical system and the energy coupling device can be reduced, for example, by appropriate decoupling measures of the energy coupling device and, in particular, of the coil and/or the like.

An embodiment of the invention therefore provides that the decoupling device has two electric capacitors having the same electric capacitance and is constructed so as to connect the coil to the rectifier unit in a galvanically isolated manner by means of the electric capacitors. By means of the electric capacitors, it is possible to connect the coil to the rectifier unit in such a way, for example, that one of the two capacitors is respectively connected in series at each of its terminals. It is ensured in this way that the coil is connected in a galvanically isolated manner to the rectifier unit. This embodiment proves to be especially advantageous when, in any case, a series capacitor is already provided for connection of the coil to the rectifier unit. Through provision of the second capacitor in a conductor that would otherwise connect one of the coil terminals to the rectifier unit in an electrically conductive manner, it is thus possible to achieve the galvanic isolation of the coil from the rectifier unit. In this way, the electric voltage at the coil can be symmetrized, as a result of which the undesired coupling produced by the parasitic capacitances can likewise be reduced.

Another embodiment of the invention provides that, in the case of a coil with a winding composed of at least one electrical conductor arranged in a plurality of turns, the decoupling device is formed so that the at least one electrical conductor is twisted. Owing to the twisting of the at least one conductor, the undesired parasitic capacitances are matched in terms of their capacitance value, as a result of which the effect on the antenna unit can likewise be reduced.

It can further be provided that the decoupling device has an electrically conductive coupling element that is arranged in the area of the coil for the capacitive coupling of the coil to the vehicle body. In this way, too, it is possible to achieve a reduction of undesired interference, because, owing to the electrically conductive coupling element, the capacitive coupling of the coil to the vehicle body can be influenced in a favorable manner. The coupling element can be formed, for example, by an electrically insulating component having a dielectric permittivity that is as high as possible The coupling element can comprise, for example, a material made of a plastic, such as polyethylene, polytetrafluoroethylene (PTFE), or the like, a ceramic, such as, for example, steatite, aluminum oxide, mica, or the like, combinations thereof, and/or the like. Beyond this, however, the coupling element can also be formed by an electrical conductor, which, in particular, is arranged in the vicinity of the coil or the winding thereof.

It has proven especially advantageous when the coupling element has a structure that suppresses any eddy current, which can be produced in the coupling element. The structure can be formed, for example, so that the coupling element comprises electrically insulating areas that separate electrically conductive areas of the coupling element electrically from one another. In the case of an electrical conductor as coupling element, it can be provided that said electrical conductor does not form any closed conductor loops. Furthermore, for this purpose, the coupling element can be composed of different materials, which are joined together in an appropriate manner to form the coupling element. In the process, the dimensions of the areas are chosen in an appropriate manner so as to fit together, so that eddy currents produced during intended operation are sufficiently small in order that no significant undesired effects on the energy transmission can occur. For example, the dimensions of the coupling element can be chosen in an appropriate manner; for example, in the case of an electrical conductor as coupling element, a diameter is chosen to be smaller than a penetration depth, and/or the like.

One embodiment provides that the coupling element has an electrically conductive plate, which extends at least into the area of the winding and electrically contacts the vehicle body solely at a single point. As a result of this, no ground loops, which lead to undesired ground currents and/or the like, are created. In this way, the effect of the coupling element can be further improved. The electrically conductive plate can be a metal plate, but it can also be a plate formed from an electrically conductive plastic, a suitably formed composite material, and/or the like.

It has proven especially advantageous when the coupling element, in particular the electrically conductive plate, has a metal wire mesh made up of individual wires. Preferably, the individual wires are arranged electrically insulated with respect to one another. In particular, the individual wires electrically contact the vehicle body solely at a single point. As a result of this, the parasitic capacitance can be adjusted in an appropriate manner. The fact that the individual wires are arranged electrically insulated with respect to one another further makes it possible to prevent the creation of significant eddy currents. In this way, it is possible, at the same time, to construct a suitable structure that suppresses eddy currents. Furthermore, this kind of contact of the individual wires enables ground loops to be prevented. The individual wires can contact the vehicle body at a common point. However, it can also be provided, moreover, that single individual wires or else pairs of individual wires contact the vehicle body at different points in an appropriate manner.

The decoupling device can preferably have an isolating transformer and be designed to connect the coil to the rectifier unit by means of the isolating transformer in a galvanically isolated manner. In this way, it is possible to achieve not only an improvement in terms of the application of a common mode signal, but it is also possible, at the same time, to achieve an electrical separation of the coil from the rectifier unit, said separation enabling an adjustment in terms of the electric voltage. In this way, it is possible to construct the coil independently of the voltage level required for the intended operation of the electrical system.

It can further be provided that the decoupling device has a common mode interference suppression element. The common mode interference suppression element is preferably arranged or connected, similarly to the isolating transformer, in the area of the coil and arranged or connected there preferably between the coil and the rectifier unit. As a result of the common mode interference suppression element, the coil can be decoupled with respect to the application of a common mode. The coupling in this regard can at least be reduced. The common mode interference suppression element can be formed, for example, by a choke, and/or the like.

The common mode interference suppression element can preferably be a common mode choke. The common mode choke can be connected at the coil terminals and the rectifier unit and can provide a high inductance for application of a common mode. It can, in particular, also be combined with the choke. In this way, it is overall possible to further improve the common mode suppression.

In accordance with another embodiment, it is proposed that the electrical system, in particular, the rectifier unit, and the isolating transformer or the common mode interference element have a separate shielding. In this way, it is possible to further improve the decoupling effect. The shielding can be formed by suitably constructed, electrically conductive housings and, in particular, sheet metal constructions, such as, for example, as a kind of tuner box, and/or the like. In particular, the shielding can be formed at least in part also by the vehicle body. Preferably, the shielding is designed in such a way that a coupling between the electrical system, in particular the rectifier unit, on the one hand, and the isolating transformer or the common mode interference element, on the other hand, can be reduced or completely suppressed. The shielding can also be combined, of course, with the other aforementioned features.

BRIEF DESCRIPTION OF THE DRAWINGS

Further advantageous effects and embodiments of the invention ensue on the basis of the following description of exemplary embodiments, taking into consideration the appended drawings. In the drawings, identical reference numbers refer to identical features and functions. The exemplary embodiments serve solely for explaining the invention and are not intended to limit the invention.

Shown are.

DETAILED DESCRIPTION

Figure 1:
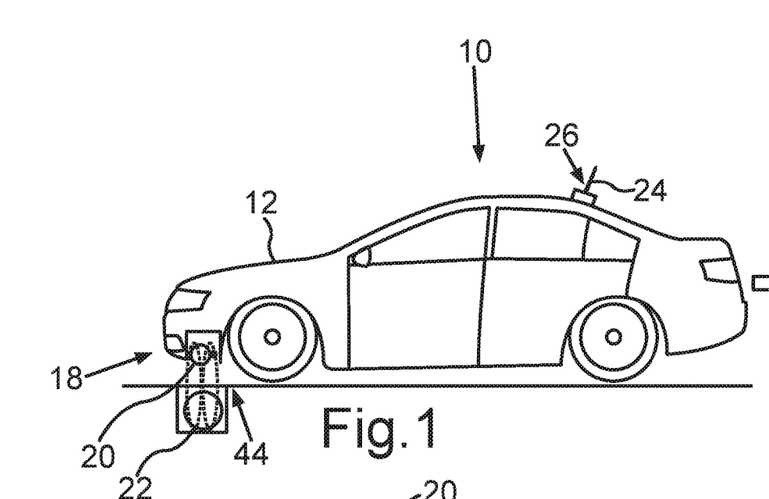
FIG. 1 in a schematic side view, a motor vehicle having an energy coupling device for wireless magnetic coupling of an energy source, which is external to the motor vehicle and provides an alternating magnetic field, as well as having an antenna unit having an antenna element.
Figure 2:
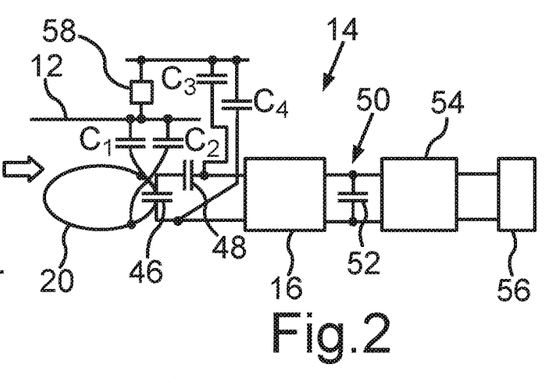
FIG. 2 in a schematic circuit diagram, an equivalent circuit diagram of an electrical system of the motor vehicle in accordance with FIG. 1.

FIG. 1 shows, in a schematic side view, a motor vehicle 10 with a vehicle body 12, which is preferably formed from sheet iron as an electrically conductive material. The motor vehicle 10 further comprises an electrical system 14 that is arranged electrically insulated from the vehicle body 12 and has a rectifier unit (FIG. 2). Furthermore, the motor vehicle 10 comprises an energy coupling device 18 arranged electrically insulated at the vehicle body 12 for supplying electric energy for the electrical system 14. For this purpose, the energy coupling device 18 has a coil 20, which serves for the wireless magnetic coupling of an energy source 22 that is external to the motor vehicle and provides an alternating magnetic field 44. The energy source is formed in the present case by a charging station, which is connected to a public energy supply grid in order to supply the energy by means of the alternating magnetic field 44. The coil 20 is connected to the rectifier unit 16 of the electrical system 14.

The motor vehicle 10 further comprises an antenna unit 26 that has an antenna element 24 and is arranged on the vehicle body 12 and is electrically insulated with respect to the electrical system 14, said antenna unit serving to provide a wireless-based communication link between a terminal communication device at the motor vehicle end and a remote communication device external to the motor vehicle. The terminal communication device and the remote communication device are not illustrated in the figures.

It can be seen in FIG. 2 that the coil 20 is connected in parallel to a capacitor 46. The parallel connection from the coil 20 and the capacitor 46 is connected to the rectifier unit 16 via a single capacitor 48. By means of the coil 20, energy is taken up from the alternating magnetic field 44 and is supplied as electric energy at the coil terminals. A suitable adjustment for the rectifier unit 46 is provided by the capacitors 46 and 48. In the present case, the rectifier unit 16 is formed by a bridge rectifier.

At its terminals, which are not illustrated, the coil 20 provides an alternating current voltage with a frequency that corresponds to the frequency of the alternating magnetic field 44. In the present case, the frequency is about 120 kHz. The capacitors 46 and 48 form a matched circuit in this respect.

On the side of the direct current voltage, the rectifier unit 16 is connected to a direct current voltage intermediate circuit 50 of the electrical system 14, which has an intermediate circuit capacitor 52. Furthermore, the direct current voltage intermediate circuit 50 is guided to a filter circuit 54, which further filters the direct current voltage supplied by the rectifier unit 16. The filter unit 54 supplies the filtered direct current voltage to electrical units 56 of the electrical system 14, and, in the present case, these units comprise an electric drive device, by means of which the motor vehicle 10 can be driven electrically. Beyond this, other electric consuming devices can be provided, which are included in the electrical system 14.

Figure 3:
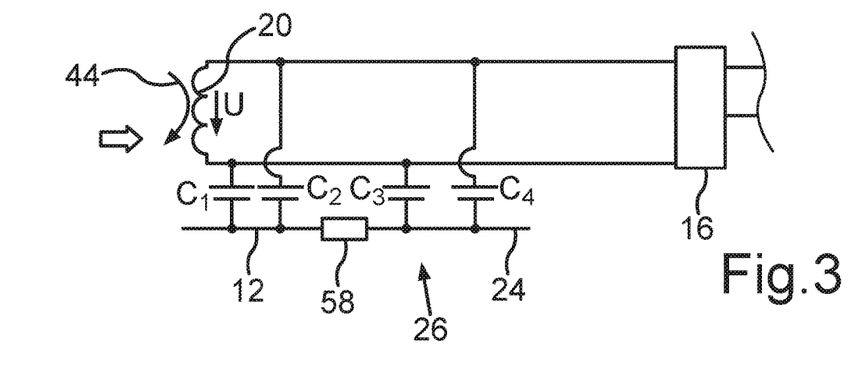
FIG. 3 an equivalent circuit diagram relating to an interference coupling of the motor vehicle in accordance with FIG. 1.
Figure 10:
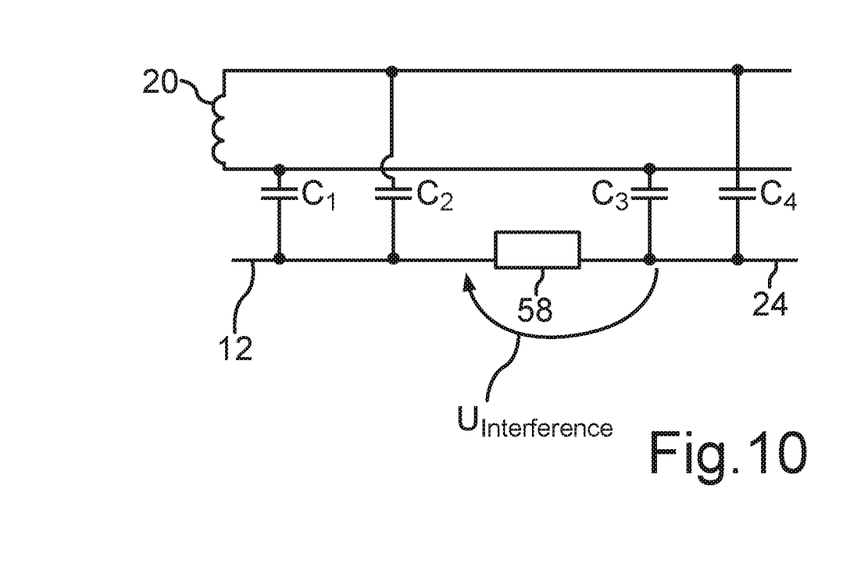
FIG. 10 a schematic equivalent circuit diagram based on FIG. 3.
Figure 11:
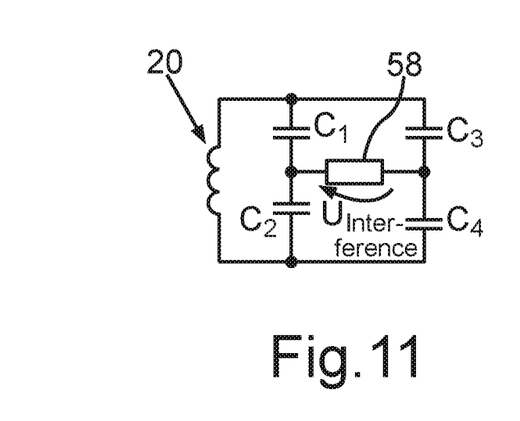
FIG. 11 an alternative illustration of the equivalent circuit diagram in accordance with FIG. 10.

FIG. 3 shows an equivalent circuit in a schematic circuit diagram, which illustrates the coupling path for an interference in-coupling into the antenna unit 26. In the present case, it can be seen that the antenna unit 26 has an impedance converter 58, to which the antenna element 24 is connected. It can be seen in FIG. 3 that the vehicle body 12 is coupled capacitively by means of capacitors $C_1$ and $C_2$, which represent parasitic capacitances, to the coil 20 and, in particular, to the terminals thereof. Correspondingly, the antenna element 24 is coupled to the coil 20 via parasitic capacitances $C_3$ and $C_4$, which likewise represent parasitic capacitances. An interference voltage $U_{Interference}$ is created at the impedance converter 58 (FIG. 10). FIG. 11 shows an alternative illustration to FIG. 10, from which it can be seen how the capacitances $C_1$ to $C_4$ act on the interference voltage $U_{Interference}$ at the impedance converter 58. This will be explained below in more detail.

Figure 4:
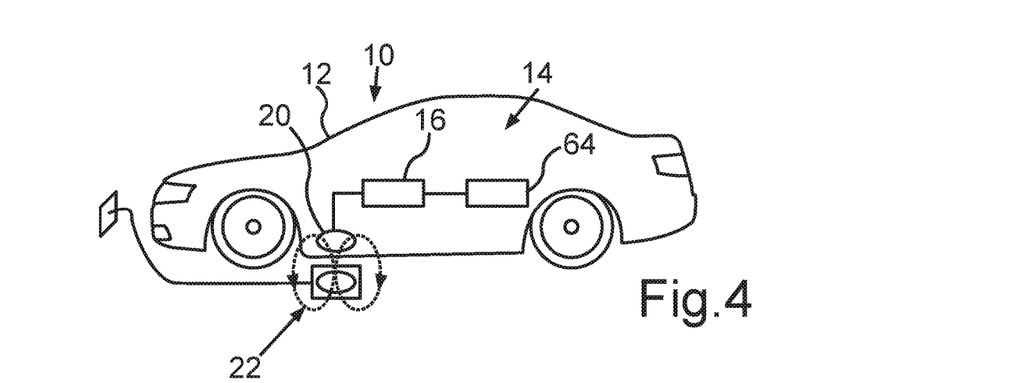
FIG. 4 in a schematic diagram, the functional principle of wireless energy coupling.

FIG. 4 shows an illustration similar to FIG. 1, in which, however, the electrical system 14 is also illustrated schematically. It can be seen in FIG. 4, in supplement to the previous illustrations, that the motor vehicle 10 or the electrical system 14 thereof comprises a high-voltage battery 64 as the electric energy storage unit, which is connected on the side of the direct current voltage to the intermediate circuit 50 of the electrical system 14.

Figure 5:
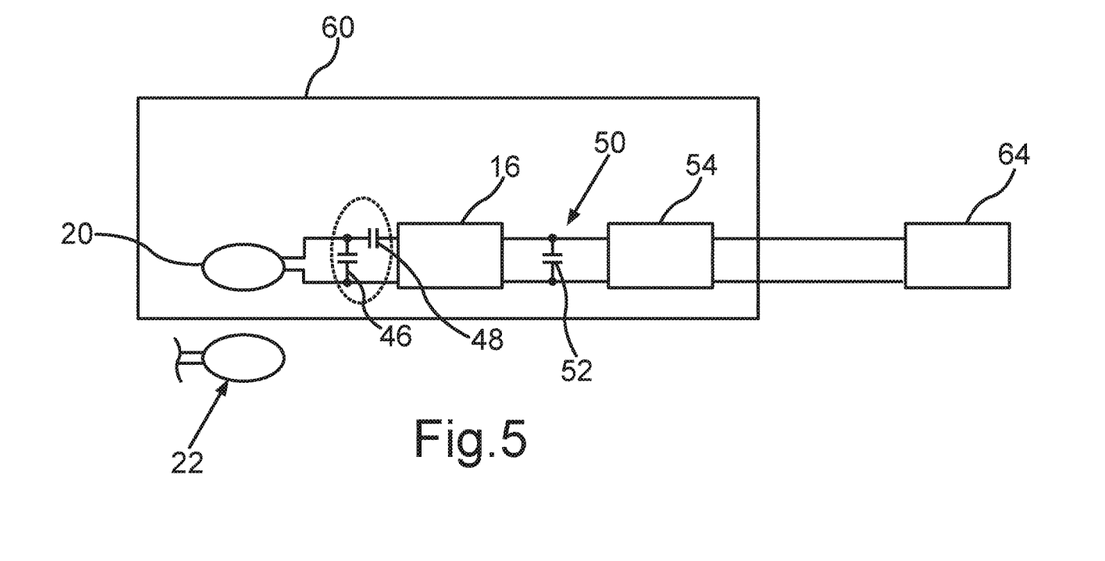
FIG. 5 in a schematic block diagram, a detailed illustration of the functional principle in accordance with FIG. 4.

FIG. 5 shows once again the components of the electrical system 14 of the motor vehicle 10, with it being seen that the coil 20, the capacitors 46 and 48, the rectifier unit 16 as well as the intermediate circuit 50 together with its intermediate circuit capacitor 52, and the filter circuit 54 are arranged in a housing 60 and thus form a compact construction unit. Preferably, the housing is at least in part electrically conductive so as to bring about at least partial shielding.

The aforementioned capacitors 46, 48 are not absolutely essential for the function of the aforementioned energy coupling device and the electrical system 14, so that, if need be, they can also be omitted.

Figure 6:
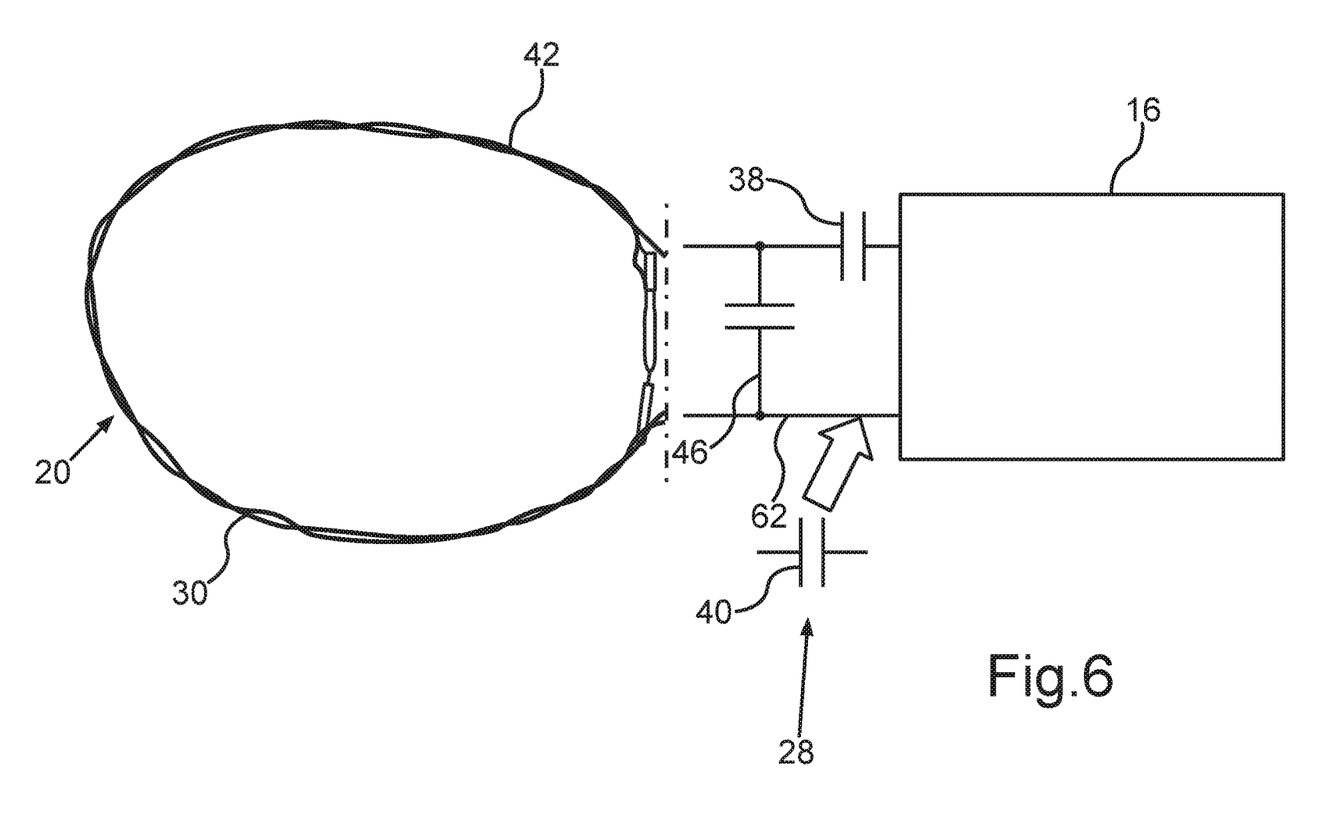
FIG. 6 a schematic circuit diagram for the connection of a coil of the energy coupling device in accordance with FIG. 5 to a rectifier unit in accordance with FIG. 5 with a decoupling device based on two capacitors having identical capacitance, in which the coil has a twisted conductor.

FIG. 6 shows another embodiment of the invention, in which the coil 20 is connected to the rectifier unit 16 via the capacitors 46, 48. In order to be able to bring about a common mode suppression in this case, it is provided in accordance with the invention that a connecting conductor 62 from the coil 20 to the rectifier unit 16 is replaced by a capacitor 40. In order to make the common mode suppression as effective as possible, it is provided that the capacitor 48 is replaced by a capacitor 38, which has the same capacitance as the capacitor 40. A decoupling device 28 can be provided in this way. Here, too, the capacitor 46 is optionally present and can also be omitted as needed.

It can be seen further from FIG. 6 that the coil has a decoupling device 30, which is formed in that a conductor 42, which, in the present case, provides two turns as winding of the coil 20, is twisted in design. As a result of the twisting, the aforementioned parasitic capacitances $C_1$ and $C_2$ as well as also the parasitic capacitances $C_3$ and $C_4$ assume roughly the same capacitance value. In this way, it is possible to reduce the common mode coupling into the antenna element 24.

Beyond this, owing to the capacitors 38, 40, the electric voltage at the coil 20 is symmetrized, as a result of which a further reduction of the interference voltage $U_{Interference}$ can be achieved.

Figure 7:
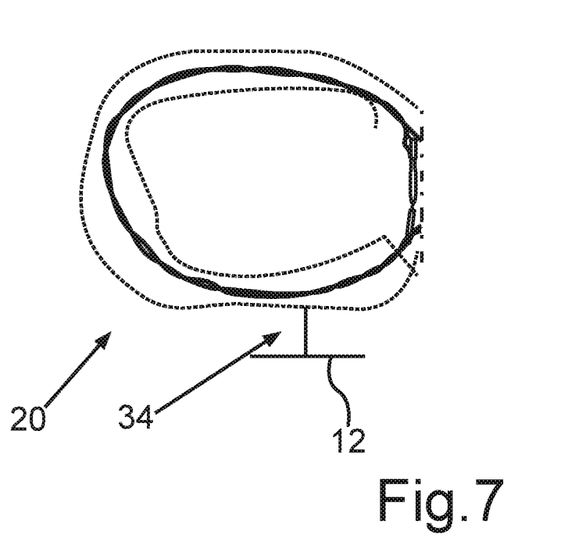
FIG. 7 in a plan view, a schematic illustration onto a coil with an electrically conductive coupling element for capacitive coupling of the coil to the vehicle body in accordance with an embodiment of the invention, in which a winding of the coil has a twisted conductor.

FIG. 7 shows another embodiment in accordance with the invention, which can also be combined with the aforementioned embodiments. It can be seen in FIG. 7 that the decoupling device has a coupling element 34 as a kind of open electrically conductive conductor loop, which at least in part surrounds the winding of the coil 20 in the plane thereof. In order to prevent undesired ground currents, it is provided that the coupling element 34 is formed by an electrically conductive wire, which forms an open conductor loop and is connected in an electrically conductive manner to the vehicle body 12 solely at a single point.

The coupling of the coil 20 to the vehicle body 12 is dependent on local particularities. By bringing the coupling elements 34 and, in particular, also a suitably formed metal wire mesh or a metal liner into the area of the coil 20, it is possible to symmetrize the capacitive coupling, so that the capacitance $C_1$ corresponds roughly to the capacitance $C_2$. Preferably, the two capacitances are identical. By way of the one-point joining of the coupling elements 34 to the vehicle body 12, it is possible to reduce or even prevent eddy currents as well as also ground loops.

Figure 8:
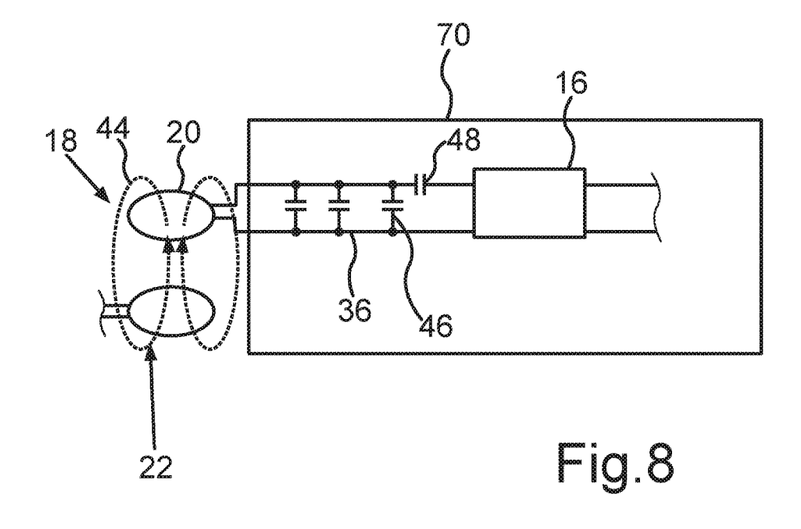
FIG. 8 another embodiment of an energy coupling device with the electrical system in accordance with the invention, with the coil of the energy coupling device being coupled by means of an isolating transformer to the rectifier unit in a galvanically isolated manner, and the electrical system being furnished with a shielding at least in the area of the isolating transformer and the rectifier unit.

FIG. 8 shows another embodiment of the invention, which likewise can be combined in nearly any way with the preceding exemplary embodiments. This exemplary embodiment is based on the circuit structure that has already been explained on the basis of FIG. 2. In contrast to the embodiment in accordance with FIG. 2, it is provided here that the coil 20 is connected to the rectifier unit 16 by means of an isolating transformer 36. The isolating transformer 36 provides for a galvanic isolation. Here, too, the capacitors 46 and 48 are present solely optionally and can, if need be, also be omitted. It can also be provided that only one of the two capacitors 46, 48 is present. Furthermore, it is provided that the isolating transformer 36, the optional capacitors 46, 48, and also the rectifier unit 16 are surrounded by an electromagnetic shielding 70. In this way, the emitted interference can be further reduced.

Figure 9:
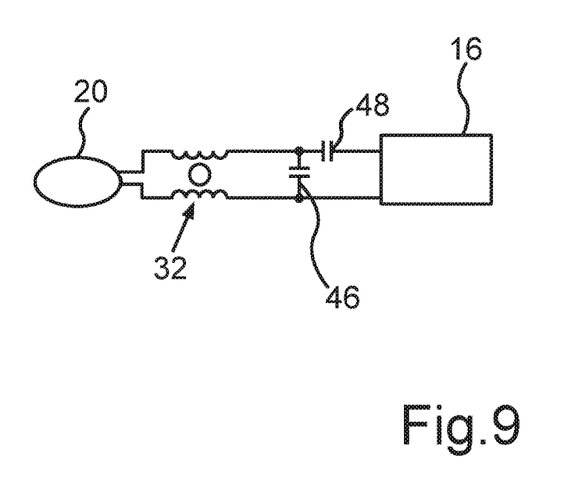
FIG. 9 an embodiment based on FIG. 8, in which, in place of the isolating transformer, a common mode choke is provided as common mode interference suppression element.

FIG. 9 shows another embodiment of the invention, which is based essentially on the embodiment in accordance with FIG. 8. In contrast to the embodiment in accordance with FIG. 8, instead of the isolating transformer 36, a common mode choke 32 is provided in this embodiment in accordance with FIG. 9. In both cases of the embodiments in accordance with FIGS. 8 and 9, it is possible in any case to achieve a reduction of the common mode effect. In this way, electric potentials are set up at the terminals of the coil 20, said electric potentials being essentially symmetrical in relation to the reference potential, which, here, is that of the vehicle body 12. As a result of the symmetry hereby achieved, it is possible to reduce the interference voltage $U_{Interference}$. Any lack of symmetry can be further reduced by a shielding, such as, for example, the shield 70. The shield 70 can be provided not only in the case of the embodiment in accordance with FIG. 8, but likewise in the case of the designs of the other exemplary embodiments. Preferably, the housing 60 can also provide the shield 70, at the same time. It is possible in this way to reduce further any emitted interference.

FIG. 10 shows a schematic equivalent circuit diagram based on FIG. 3, with which the coupling paths that result in application of the interference voltage $U_{Interference}$ at the impedance converter 58 are clarified. FIG. 11 shows, in another schematic illustration, the structure in accordance with FIG. 10 in an H-structure. In this way, it can be seen in a simple way how the creation of the interference voltage $U_{Stör}$ at the impedance converter 58 results due to the intended operation of the energy coupling device 18 and how the interference voltage $U_{Interference}$ depends on the parasitic capacitances $C_1$ to $C_4$.

The exemplary embodiments serve solely for explanation of the invention and are not intended to limit the invention. Obviously, the person skilled in the art will provide for corresponding variations as needed, without departing from the core concept of the invention. Of course, individual features can also be combined with one another in any way. Beyond this, it is possible, of course, to present device features also through corresponding method steps.

The invention claimed is:

1. A motor vehicle, comprising:
    a vehicle body, which is formed at least in part from an electrically conductive material,
    an electrical system that is arranged electrically insulated from the vehicle body and has a rectifier unit,
    an energy coupling device, which is arranged electrically insulated at the vehicle body for supplying electric energy for the electrical system, wherein the energy coupling device has a coil for wireless magnetic coupling of an energy source that is external to the motor vehicle and provides an alternating magnetic field, wherein the coil is connected to the rectifier unit of the electrical system,
    an antenna unit that has an antenna element and is arranged at the vehicle body and is electrically insulated with respect to the electrical system for providing a wireless-based communication link between a terminal communication device at the motor vehicle end and a remote communication device external to the motor vehicle, and
    a decoupling device for the electromagnetic decoupling of the coil from the antenna unit wherein the decoupling device has an electrically conductive coupling element, arranged in an area of the coil, which capacitively couples the coil to the vehicle body.

2. The motor vehicle according to claim 1, wherein the decoupling device has two electric capacitors with identical electric capacitance and is constructed to connect the coil to the rectifier unit in a galvanically isolated manner by means of the electric capacitors.

3. The motor vehicle according to claim 1, wherein in the case of a coil with a winding composed of at least one electrical conductor, arranged in a plurality of turns, the decoupling device is formed by twisting the at least one electrical conductor.

4. The motor vehicle according to claim 1, wherein the coupling element has a structure that suppresses any eddy current that can be produced in the coupling element.

5. The motor vehicle according to claim 1, wherein the coupling element has an electrically conductive plate, which extends at least in an area of the winding and electrically contacts the vehicle body solely at a single point.

6. The motor vehicle according to claim 1, wherein the coupling element has a metal wire mesh made up of individual wires, which are arranged electrically insulated with respect to one another, wherein the individual wires electrically contact the vehicle body solely at a single point.

7. The motor vehicle according to claim 1, wherein the decoupling device has an isolating transformer and is constructed so as to connect the coil to the rectifier unit in a galvanically isolated manner by means of the isolating transformer.

8. The motor vehicle according to claim 1, wherein the decoupling device has a common mode interference suppression element.

9. The motor vehicle according to claim 8, wherein the common mode interference suppression element has a common mode choke.

10. The motor vehicle according to claim 7, wherein the electrical system, in particular the rectifier unit, and the isolating transformer or the common mode interference suppression element have a separate shielding.

\* \* \* \* \*